Sept. 30, 1969  A. R. GAGNE  3,469,553

AMPHIBIOUS VEHICLE

Filed July 31, 1967  2 Sheets-Sheet 1

INVENTOR
ARCHIE R. GAGNE

BY Richard L. Lindberg
ATTORNEY

Sept. 30, 1969   A. R. GAGNE   3,469,553
AMPHIBIOUS VEHICLE
Filed July 31, 1967   2 Sheets-Sheet 2

INVENTOR
ARCHIE R. GAGNE
BY
ATTORNEY

United States Patent Office 3,469,553
Patented Sept. 30, 1969

3,469,553
AMPHIBIOUS VEHICLE
Archie R. Gagne, 25 W. 164 Denise Ave., Rte. 3, Box 96,
Naperville, Ill. 60540
Filed July 31, 1967, Ser. No. 657,291
Int. Cl. B60f *3/00;* B62d *55/02*
U.S. Cl. 115—1                                3 Claims

ABSTRACT OF THE DISCLOSURE

An amphibious vehicle characterized by endless crawler treads and ground engaging wheels, the former over normal terrain being out of contact therewith and driving the wheels, and being adapted in a snow covered or marshy and swampy terrain to provide tractive effort to the vehicle. The structure according to the invention is also characterized by outrigger pontoons adapted to be detachably secured thereto and enabling with paddle members secured to the ground engaging wheels to move the vehicle over the surface of a body of water.

---

One of the principal objects of the invention is to provide a vehicle characterized by ground engaging wheels providing tractive effort at relatively higher speeds over relatively smooth and dry terrain, said wheels being driven by endless crawler treads moving in a terrain engaging path not far above the smooth terrain engaged by the wheels, and being adapted to provide tractive effort for the vehicle when the terrain is covered with deep snow to a depth where the ground engaging wheels cannot tractively engage.

Another object is to provide a vehicle having ground engaging tractive wheels for operation over dry terrain and endless crawler treads for supplying tractive effort to the wheels for dry terrain operation and tractive effort for operation over terrain covered by deep snow, for example.

Yet another object is to provide a vehicle capable of having pontoon members detachably secured thereto, and with paddle members secured to the ground engaging wheels to enable the vehicle to move on the surface of a body of water.

Figure 1:
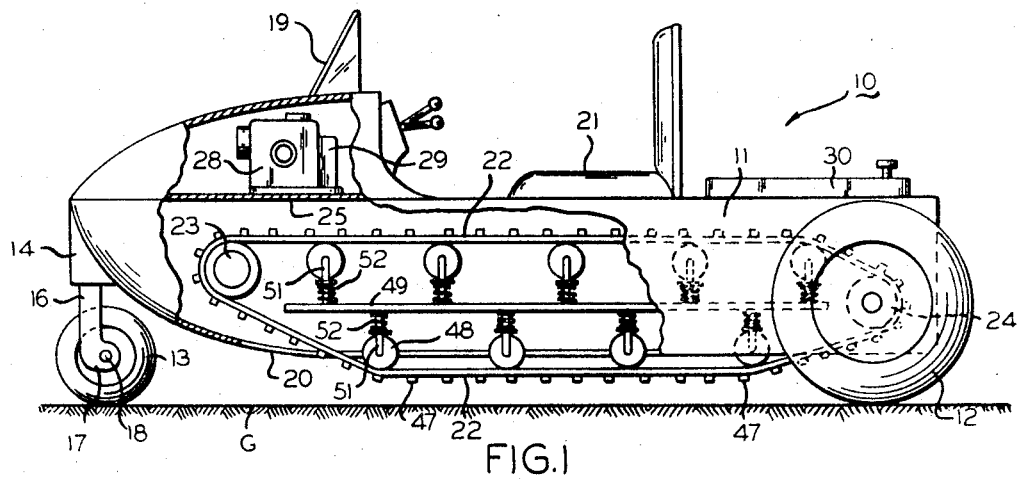
FIG. 1 is a front elevation view, certain parts being broken away, of an amphibious vehicle having the improvements according to the present invention embodied therein.

Referring now to the drawings, the improved amphibious vehicle according to the present invention is denoted by the reference numeral 10 and includes a body and frame assembly 11 provided with a pair of rear ground engaging wheels 12 and a front caster wheel 13. A front wheel mounting 14 extends from the forward end of the body 11 and a vertical spindle 16 freely turning in mounting 14 has a lower end thereof terminating in spaced clevis arms 17. An idler shaft 18 is supported in the spaced clevis arms 17 and the freely turning front ground engaging wheel 13 turns on shaft 18.

Body 11 is provided with a winshield 19 and a pair of side by side operator and passenger seats 21.

Figure 2:
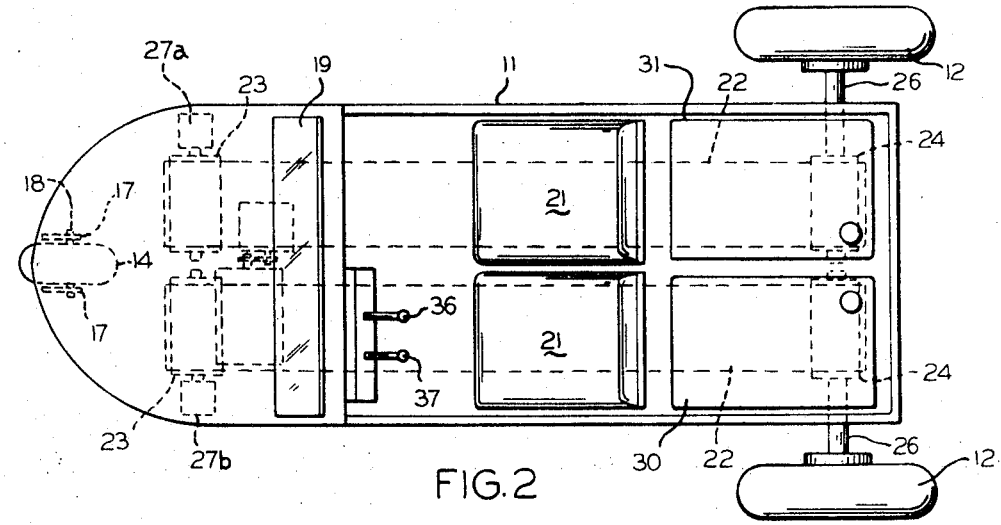
FIG 2 is a plan view thereof.

Driving effort for the ground engaging wheels 12 is provided by endless crawler treads 22 trained between a front sprocket 23 and a rear sprocket 24. Each of the sprockets 24 is fast upon an axle shaft 26 supported in any convenient fashion in the body and frame assembly 11, as shown somewhat schematically in FIG. 2, each axle shaft having the ground engaging wheel 12 secured thereto. The front driving sprockets 23 are each driven by respective hydraulic motors 27a and 27b receiving motive fluid from an hydraulic pump 29 driven by an engine 28. The latter are mounted on a frame member 25 forming part of the body and frame assembly 11. Drive engine 28 is supplied with fuel from a tank 30 mounted to the rear of the operator's seat 21, and connected to drive engine 28 by a supply line 35.

Figure 3:
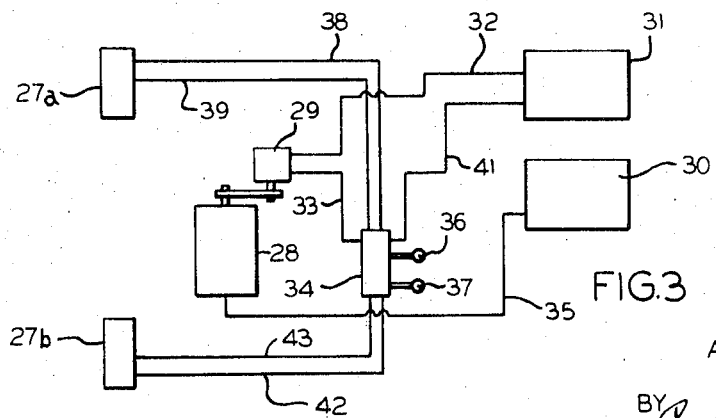
FIG. 3 is a schematic view of an hydraulic circuit for providing motive power to the vehicle of FIGS. 1 and 2.
Figure 4:
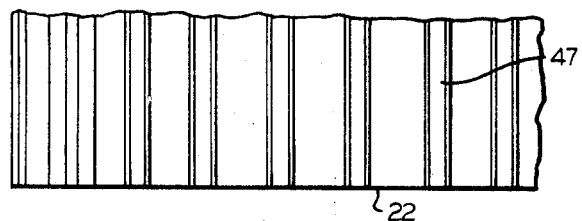
FIG. 4 is a plan view of a portion of an endless crawler tread for supplying tractive effort to the vehicle of FIGS. 1 and 2 when operating over snow covered terrain.

Referring now particularly to FIG. 3, which shows an hydraulic circuit for driving the hydraulic motors 27a and 27b, said hydraulic circuit comprises a reservoir 31 located behind the passenger's seat 21, and connected by a line 32 to the intake side of the hydraulic pump 29, motive fluid under pressure leaving the pump 29 by way of a high pressure line 33 connected to a control valve 34. The latter has a pair of control handles 36 and 37, control handle 36 controlling the supply of motive fluid to hydraulic motor 27a by means of a high pressure line 38. Spent fluid from the hydraulic motor 27a returns to the control valve 34 by means of a return line 39, and then through the control valve 34 to the tank 31 by means of a tank line 41.

Control handle 37 of the control valve 34 controls the flow of pressure fluid to the hydraulic motor 27b, the latter being connected to the valve 34 by means of a high pressure line 42. Spent fluid from hydraulic motor 27b is returned through the valve 34 by a return line 43 and thence to the tank 31 by the return line 41.

The form of the control valve 34 is no part of the invention herein, and it is sufficient to say at this point that the control handles 36 and 37 are so manipulated as to nicely control the supply of power selectively to the rear ground engaging wheels 12 so as to cause the vehicle 10 to travel in a straight line, to change the direction of travel, or to reverse the same if desired. Front caster wheel 13 takes no part in the steering.

Figure 5:
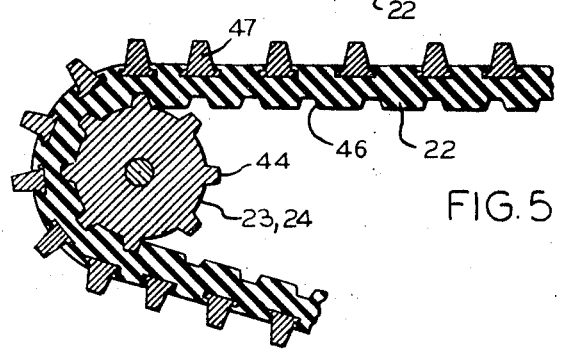
FIG. 5 is a longitudinal section taken through the endless crawler tread of FIG. 4.

Referring now to FIG. 5, the endless crawler tread 22 is preferably formed of flexible elastomeric material and is adapted to engage with the sprockets 23, 24, each of said sprockets having teeth 44 of a pitch corresponding to the pitch distance of sprocket engaging transverse grooves 46 in the inside face of crawler tread 22. The opposite face thereof is provided with terrain engaging cleats 47 molded integrally with the material of tread 22 at any desired pitch distance which may be the same or different from the pitch distance of the grooves 46.

Proper tension is maintained upon the endless treads 22 by means of spring biased idlers 48 extending upward from and downward from a lengthwise extending member 49 secured in any fashion to the body and frame 11. Each of said idlers 48 is mounted on a support 51 biased by a spring 52 in such a fashion that the rollers 48 place the proper amount of tension upon its associated endless crawler tread 22.

The vehicle thus far described also finds use in marshy or boggy terrain where the ground engaging wheels 12 would sink into the soft terrain to a position where the endless crawler treads 22 would be engaged with the terrain surface. As with the condition where the terrain is covered with snow the endless crawler treads 22 would supply the tractive effort to the vehicle 10.

Figure 6:
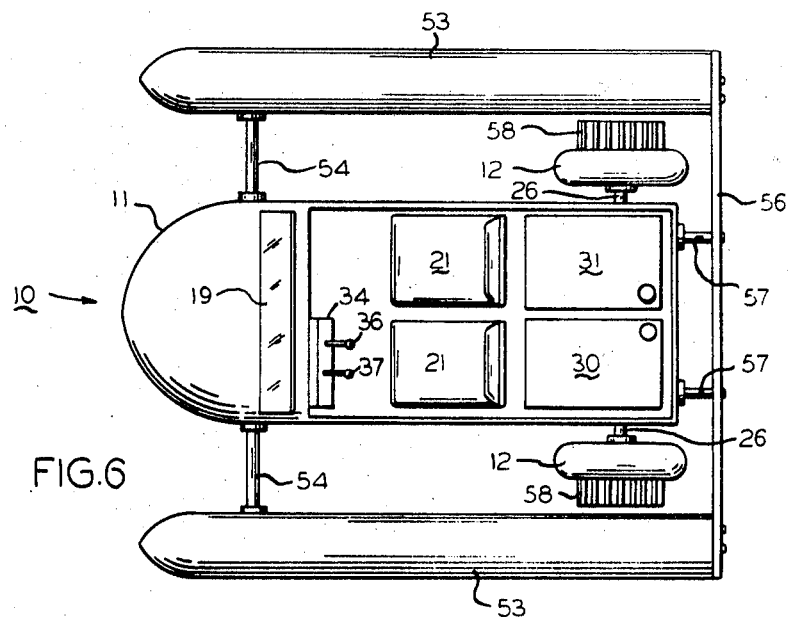
FIG. 6 is a plan view showing the vehicle of FIGS. 1 and 2 equipped with pontoons for operation over water.
Figure 7:
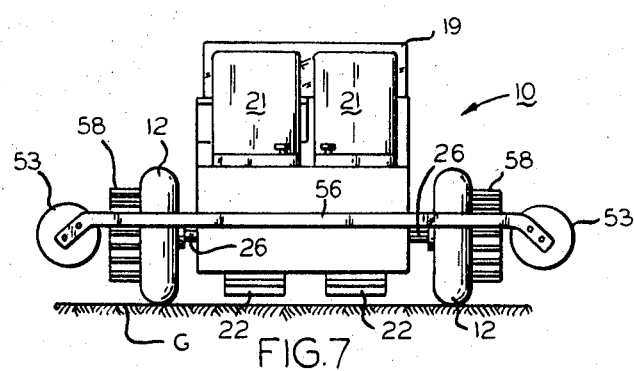
FIG. 7 is an end view of FIG. 6.

The vehicle thus far described also lends itself to operation over a body of water. As seen in FIGS. 6 and 7 the vehicle 10 can be provided with outrigger pontoons 53 which are joined at the forward ends of the body and frame assembly 11 by struts 54 secured at each end to the pontoon and to the body 11 in any suitable fashion. The rear ends of the pontoons 53 are connected by a rearward laterally extending spacer member 56 joined by strut members 57 to the rear of the body 11 as seen in FIG. 6. Motive power for driving the vehicle 10 while so equipped with the pontoons 53 across a body of water is provided by the hydraulic system previously described, and in part by the cleats 47 of the endless crawler treads 22. However, in order to provide greater efficiency for operation of the vehicle 10 on a body of water the wheels 12 are each detachably provided with paddle wheels 58 which can be secured to the outer faces thereof in any convenient manner. The precise fashion in which such paddle wheels 58 are secured to the wheels 12 forms no part of the present invention, and any suitable structure to that end may be furnished as desired.

From the foregoing description it is believed evident that there has been provided a vehicle having the ability to operate over dry as well as snow covered terrain, and boggy or marshy terrains as well. Moreover, the vehicle described lends itself to the placement of pontoons thereon whereby with paddle members applied to normally ground engaging wheels propulsive effort may be applied thereto for operation on a body of water. In such latter cases the endless crawler treads for operating the vehicle over snow covered and marshy terrain lend themselves additionally to propulsive effort.

While the invention has been described in terms of a preferred embodiment thereof, its scope is not intended to be limited by the precise embodiment shown nor otherwise than by the claims here appended.

I claim:

1. A vehicle comprising a vehicle frame, front and rear ground engaging wheels, means for applying tractive effort to at least a pair of said ground engaging wheels comprising endless crawler treads trained between driving means for said wheels and hydraulically driven power means, a prime mover for driving said hydraulic power means, said endless crawler treads having lower reaches which are spaced above the ground when the ground engaging wheels having tractive effort applied thereto are engaged with firm terrain, said lower reaches being engageable with terrain of a nature whereby the ground engaging wheels with tractive effort placed thereon are embedded in the terrain, whereby the said lower reaches in such described terrain apply tractive effort for movement of said vehicle.

2. The vehicle according to claim 1 wherein said driving means for a ground engaging wheel has a smaller diameter than the diameter of the ground engaging wheel driven thereby, whereby the vehicle moves at high speed over firm terrain and a lower speed when said lower reach is engaged with a terrain of a nature where the ground engaging wheels are embedded therein.

3. The invention according to claim 1 wherein said vehicle frame is provided with a body, and said lower reach moves in a slot provided in the lower portions of said body.

References Cited

UNITED STATES PATENTS

| | | | |
|---|---|---|---|
| 1,183,669 | 5/1916 | Rider | 180—9.36 XR |
| 1,505,009 | 8/1924 | De Borggrave | 180—9.36 XR |
| 2,049,702 | 8/1936 | Howe | 115—1 |
| 3,188,996 | 6/1965 | Thompson | 115—1 |
| 3,310,020 | 3/1967 | Slemmons | 115—1 |

FOREIGN PATENTS 825,073  12/1959  Great Britain.

ANDREW H. FARRELL, Primary Examiner

U.S. Cl. X.R.

180—9.36